United States Patent
Hoskinson

(10) Patent No.: US 12,475,399 B2
(45) Date of Patent: Nov. 18, 2025

(54) SYSTEMS AND METHODS FOR INCREASING ENERGY-SCALE BY MINIMIZING QUBIT INDUCTANCE

(71) Applicant: D-WAVE SYSTEMS INC., Burnaby (CA)

(72) Inventor: Emile M. Hoskinson, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 18/718,588

(22) PCT Filed: Dec. 14, 2022

(86) PCT No.: PCT/US2022/081515
§ 371 (c)(1),
(2) Date: Jun. 11, 2024

(87) PCT Pub. No.: WO2023/219656
PCT Pub. Date: Nov. 16, 2023

(65) Prior Publication Data
US 2025/0053842 A1    Feb. 13, 2025

Related U.S. Application Data

(60) Provisional application No. 63/265,388, filed on Dec. 14, 2021.

(51) Int. Cl.
*H03K 17/92* (2006.01)
*G06N 10/40* (2022.01)

(52) U.S. Cl.
CPC ............. *G06N 10/40* (2022.01); *H03K 17/92* (2013.01)

(58) Field of Classification Search
CPC ...................................................... H03K 17/92
(Continued)

(56) References Cited

U.S. PATENT DOCUMENTS 6,128,764 A    10/2000  Gottesman
6,157,044 A    12/2000  Nakanishi et al.
(Continued)

FOREIGN PATENT DOCUMENTS

EP          1085422 A2      3/2001
KR       20190015330 A      2/2019
(Continued)

OTHER PUBLICATIONS

Aassime et al., "Radio-frequency Single-electron Transistor as Readout Device for Qubits: charge sensitivity and backaction", Phys Rev Lett 86, pp. 3376-3379, 2001.
(Continued)

*Primary Examiner* — Tomi Skibinski
(74) *Attorney, Agent, or Firm* — Cozen O'Connor

(57) ABSTRACT

In a superconducting quantum processor, inductance is a characteristic of superconducting flux qubits and used to achieve coupling between qubits. In general, higher qubit energy scale results in better quantum processor performance. Energy scale of qubits can be increased by reducing inductance. For each Ising spin problem, qubit energy scale can be increased by determining the unused inductance-tuner range for each qubit and the minimum homogenized inductance achievable across all qubits, then adjusting the inductance-tuner to achieve the minimum homogenized inductance. When the inductance of a qubit is changed, there is a shift in the CCJJ bias at which quantum annealing is performed for that qubit. The variation in CCJJ bias shift can be compensated by computing the shift in CCJJ bias due to the applied inductance and applying a compensating CCJJ bias via the CCJJ offset DAC.

20 Claims, 4 Drawing Sheets

(58) Field of Classification Search
USPC .................................................... 327/528
See application file for complete search history.

(56) References Cited

U.S. PATENT DOCUMENTS

| | | |
|---|---|---|
| 6,169,981 B1 | 1/2001 | Werbos |
| 6,317,766 B1 | 11/2001 | Grover |
| 6,360,112 B1 | 3/2002 | Mizuno et al. |
| 6,459,097 B1 | 10/2002 | Zagoskin |
| 6,504,172 B2 | 1/2003 | Zagoskin et al. |
| 6,563,310 B2 | 5/2003 | Zagoskin |
| 6,563,311 B2 | 5/2003 | Zagoskin |
| 6,605,822 B1 | 8/2003 | Blais et al. |
| 6,614,047 B2 | 9/2003 | Tzalenchuk et al. |
| 6,627,915 B1 | 9/2003 | Ustinov et al. |
| 6,627,916 B2 | 9/2003 | Amin et al. |
| 6,633,053 B1 | 10/2003 | Jaeger |
| 6,649,929 B2 | 11/2003 | Newns et al. |
| 6,728,131 B2 | 4/2004 | Ustinov |
| 6,753,546 B2 | 6/2004 | Tzalenchuk et al. |
| 6,803,599 B2 | 10/2004 | Amin et al. |
| 6,838,694 B2 | 1/2005 | Esteve et al. |
| 6,885,325 B2 | 4/2005 | Omelyanchouk et al. |
| 6,900,454 B2 | 5/2005 | Blais et al. |
| 6,911,664 B2 | 6/2005 | Il et al. |
| 6,919,579 B2 | 7/2005 | Amin et al. |
| 6,936,841 B2 | 8/2005 | Amin et al. |
| 6,943,368 B2 | 9/2005 | Amin et al. |
| 6,978,070 B1 | 12/2005 | McCarthy et al. |
| 6,979,836 B2 | 12/2005 | Zagoskin et al. |
| 6,984,846 B2 | 1/2006 | Newns et al. |
| 7,002,174 B2 | 2/2006 | Il et al. |
| 7,015,499 B1 | 3/2006 | Zagoskin |
| 7,133,888 B2 | 11/2006 | Kohn et al. |
| 7,135,701 B2 | 11/2006 | Amin et al. |
| 7,230,266 B2 | 6/2007 | Hilton et al. |
| 7,253,654 B2 | 8/2007 | Amin |
| 7,307,275 B2 | 12/2007 | Lidar et al. |
| 7,335,909 B2 | 2/2008 | Amin et al. |
| 7,533,068 B2 | 5/2009 | Maassen et al. |
| 7,605,600 B2 | 10/2009 | Harris |
| 7,613,764 B1 | 11/2009 | Hilton et al. |
| 7,624,088 B2 | 11/2009 | Johnson et al. |
| 7,639,035 B2 | 12/2009 | Berkley |
| 7,843,209 B2 | 11/2010 | Berkley |
| 7,876,248 B2 | 1/2011 | Berkley et al. |
| 7,880,529 B2 | 2/2011 | Amin |
| 7,898,282 B2 | 3/2011 | Harris et al. |
| 8,098,179 B2 | 1/2012 | Bunyk et al. |
| 8,102,185 B2 | 1/2012 | Johansson et al. |
| 8,169,231 B2 | 5/2012 | Berkley |
| 8,190,548 B2 | 5/2012 | Choi |
| 8,195,596 B2 | 6/2012 | Rose et al. |
| 8,421,053 B2 | 4/2013 | Bunyk et al. |
| 8,536,566 B2 | 9/2013 | Johansson et al. |
| 8,611,974 B2 | 12/2013 | Maibaum et al. |
| 8,644,898 B1 | 2/2014 | De Andrade et al. |
| 8,854,074 B2 | 10/2014 | Berkley |
| 8,951,808 B2 | 2/2015 | Ladizinsky et al. |
| 9,015,215 B2 | 4/2015 | Berkley et al. |
| 9,495,644 B2 | 11/2016 | Chudak et al. |
| 9,870,277 B2 | 1/2018 | Berkley |
| 10,037,493 B2 | 7/2018 | Harris et al. |
| 10,068,180 B2 | 9/2018 | Amin et al. |
| 10,312,141 B2 | 6/2019 | Kirby et al. |
| 10,528,886 B2 | 1/2020 | Boothby |
| 10,552,755 B2 | 2/2020 | Lanting et al. |
| 10,938,346 B2 | 3/2021 | Berkley et al. |
| 11,127,893 B2 | 9/2021 | Johnson et al. |
| 11,182,230 B2 | 11/2021 | Berkley et al. |
| 11,424,521 B2 | 8/2022 | Whittaker et al. |
| 11,494,683 B2 | 11/2022 | Amin et al. |
| 2002/0060635 A1 | 5/2002 | Gupta |
| 2002/0179937 A1 | 12/2002 | Ivanov et al. |
| 2002/0180006 A1 | 12/2002 | Franz et al. |
| 2003/0016069 A1 | 1/2003 | Furuta et al. |
| 2004/0016918 A1 | 1/2004 | Amin et al. |
| 2004/0071019 A1 | 4/2004 | Magnus et al. |
| 2005/0047245 A1 | 3/2005 | Furuta et al. |
| 2006/0147154 A1 | 7/2006 | Thom et al. |
| 2009/0322374 A1 | 12/2009 | Przybysz et al. |
| 2012/0124432 A1 | 5/2012 | Pesetski et al. |
| 2014/0229722 A1 | 8/2014 | Harris |
| 2015/0032991 A1 | 1/2015 | Lanting et al. |
| 2015/0219730 A1 | 8/2015 | Tsukamoto et al. |
| 2015/0263736 A1 | 9/2015 | Herr et al. |
| 2016/0335558 A1 | 11/2016 | Bunyk et al. |
| 2017/0256698 A1 | 9/2017 | Nayfeh et al. |
| 2018/0054201 A1 | 2/2018 | Reagor et al. |
| 2018/0247217 A1 | 8/2018 | Heeres et al. |
| 2018/0341874 A1 | 11/2018 | Puri et al. |
| 2019/0019098 A1 | 1/2019 | Przybysz |
| 2019/0164959 A1 | 5/2019 | Thomas et al. |
| 2019/0237648 A1 | 8/2019 | Przybysz et al. |
| 2019/0392878 A1 | 12/2019 | Murduck et al. |
| 2020/0036332 A1 | 1/2020 | Abdo |
| 2020/0090738 A1 | 3/2020 | Naaman et al. |
| 2020/0320426 A1 | 10/2020 | Amin et al. |
| 2021/0013391 A1 | 1/2021 | Johnson et al. |
| 2021/0073667 A1 | 3/2021 | Harris |
| 2021/0133385 A1* | 5/2021 | Molavi ................ G06F 30/367 |
| 2021/0190885 A1 | 6/2021 | Swenson et al. |
| 2021/0248506 A1 | 8/2021 | Hoskinson et al. |
| 2022/0123048 A1 | 4/2022 | Swenson et al. |
| 2023/0027682 A1 | 1/2023 | Molavi et al. |
| 2023/0106489 A1 | 4/2023 | Harris |
| 2023/0370069 A1 | 11/2023 | Amin et al. |

FOREIGN PATENT DOCUMENTS

| | | |
|---|---|---|
| WO | 2015013532 A1 | 1/2015 |
| WO | 2021126875 A1 | 6/2021 |
| WO | 2022155140 A1 | 7/2022 |
| WO | 2023004040 A1 | 1/2023 |
| WO | 2023114811 A1 | 6/2023 |
| WO | 2023219656 A2 | 11/2023 |
| WO | 2024050333 A1 | 3/2024 |
| WO | 2024102504 A2 | 5/2024 |
| WO | 2024172854 A2 | 8/2024 |

OTHER PUBLICATIONS

Allman, et al., "RFSQUID-Mediated Coherent Tunable Coupling Between a Superconducting Phase Qubit and a Lumped Element Resonator", arXiv:1001.0816v1 [cond-mat.supr-con], Jan. 6, 2010.
Al-Saidi et al., "Eigenstates of a small Josephson junction coupled to a resonant cavity", Physical Review B, 65, pp. 014512-1 to 014512-7, 2001.
Amin et al., "Thermally assisted adiabatic quantum computation," arXiv:cond-mat/0609332v2, pp. 1-5, (Mar. 2, 2007) Feb. 1, 2006.
Amin, "Effect of Local Minima on Adiabatic Quantum Optimization," arXiv:0709.0528v2, Apr. 4, 2008.
Anton, et al., "Magnetic Flux Noise in dc SQUIDs: Temperature and Geometry Dependence", Physical Review Letters, PRL 110, 147002, Apr. 5, 2013.
Armour et al., "Entanglement and Decoherence of a Micromechanical Resonator via Coupling to a Cooper-Pair Box", Physical Review Letters, 88, pp. 148304-1 to 148301-4, 2002.
Ataides, et al., "the XZZX surface code", Nature Communications, https://doi.org/10.1038/s41467-021-22274-1,. 2021, 12 pages.
Auger James M. Fault-tolerance thresholds for the surface code with fabrication errors, arXiv:1706.04912v1, Jun. 15, 2017.
Averin et al., "Quantum Computing and Quantum Measurements With Mesoscopic Josephson Junctions", Fortschritte der Physik 48, pp. 1055-1074, 2000.
Averin et al., "Variable Electrostatic Transformer: Controllable Coupling of Two Charge Qubits," Physical Review Letters 91(5): 057003-1-057003-4, Aug. 1, 2003. arXiv:cond-mat/0304166v1, Apr. 7, 2003.
Barends, et al., Logic Gates at the Surface Code Threshold: Superconducting Qubits Poised for Fault-tolerant Quantum Computing, 2014, arXiv:1402.4848.

(56) References Cited

OTHER PUBLICATIONS

Barone et al., "Quantum Computation With Aharonov-Bohm Qubits", www.arXiv.org preprint: cond-mat/0203038 v1 (Mar. 2, 2002).
Barrett, et al., "Fault Tolerant Quantum Computation with Very High Threshold for Loss Errors", Phys. Rev. Lett. 105, 200502—Published Nov. 9, 2010, 4 pages.
Baust,, Characterization of Flux-driven Josephson Parametric Amplifiers, Diploma Thesis, Technische Universitat Munchen, Aug. 2010, 119 pages.
Bell et al., "Traveling Wave Parametric Amplifier based on a chain of Coupled Asymmetric SQUIDs", arXiv:1509.04573 [cond-mat.supr-con], Sep. 15, 2015.
Bell, et al., "SQUID Based Superconducting Traveling-Wave Parametric Amplifier", IEEE/CSC & ESAS Superconductivity News Forum (global edition), Oct. 2014, 3 pages.
Benjamin, Quantum Computing Without Local Control Of Qubit-Qubit Interactions, 2001, 4 pages.
Biamonte et al., "Realizable Hamiltonians for universal adiabatic quantum computers," arXiv:0704.1287v2, Jun. 17, 2008, 7 pages.
Blais et al., "Operation of universal gates in a solid-state quantum computer based on clean Josephson junctions between d-wave superconductors", Physical Review A, 61, 042308, 2000.
Blais et al., "Quantum netWork optimization", Physical Review A, 64, pp. 022312-1 to 022312-5 (2001).
Blais et al., "Tunable Coupling of Superconducting Qubits," arXiv:cond-mat/0207112v3 [cond-mat.mes-hall], Mar. 18, 2003, 4 pages.
Blais, et al., "Cavity quantum electrodynamics for superconducting electrical circuits" an architecture for quantum computation, arXiv:cond-mat/0402216v1, Feb. 7, 2004, pp. 1-14 (Year:2004).
Blatter et al., "Design aspects of superconducting-phase quantum bits," Physical Review B 63: 174511-1-174511-9, 2001.
Boothby et al., "Architectural considerations in the design of a third-generation superconducting quantum annealing processor", arXiv: 2108.02322v1, Aug. 2021, pp. 3-4; and figure 4.
Bravyi et al., "The Complexity of Stoquastic Local Hamiltonian Problems," arXiv:quant-ph/0606140v4, Oct. 2, 2007, 21 pages.
Bravyi, et al., "Hight-threshold and low-overhead fault-tolerant quantum memory", arXiv:2308.07915v1 [quant-ph] Aug. 15, 2023, 38 pages.
Bravyi, et al., "Universal quantum computation with ideal Clifford gates and noisy ancillas", arXiv:quant-ph/0403025v2 Dec. 16, 2004, 15 pages.
Brennen et al., "Why should anyone care about computing with anyons?," arXiv:0704.2241v1 [quant-ph], pp. 1-12, Apr. 18, 2007.
Brown, et al., "A fault-tolerant non-Clifford gate for the surface code in two dimensions", Science Advances, May 22, 2020, vol. 6, Issue 21, 25 pages.
Buisson et al., "Entangled states in a Josephson charge qubit coupled to a superconducting resonator", arXiv.org: cond/mat/0008275v1, Aug. 18, 2000.
Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.
Burkard et al., "Spintronics and Quantum Dots for Quantum Computing and Quantum Communication," Fortschritte der Physik 48, pp. 965-986, 2000.
Carelli et al., "SQUID Systems for Macroscopic Quantum Coherence and Quantum Computing", IEEE trans. Apple. Supercond., Mar. 1, 2001. https://ieeexplore.ieee.org/document/919321.
Chamberland et al, "Building A Fault-Tolerant Quantum Computer Using Concatenated Cat Codes", arXiv:2012.04108v2 [quant-ph] Jan. 27, 2022,117 page.
Chamon, et al., "A superconducting circuit realization of combinatorial gauge symmetry", arXiv:2006.10060v1 [quant-ph] Jun. 17, 2020, 9 pages.
Chancellor et al., "Circuit design for multi-body interactions in superconducting quantum annealing systems with applications to a scalable architecture", arXiv:1603.09521v5, Oct. 13, 2017.

Chancellor, et al., "Scalable Universal Holonomic Quantum Computation Realized with an Adiabatic Quantum Data Bus and Potential Implementation Using Superconducting Flux Qubits", arXiv:1301.7100v3 [quant-ph], Mar. 21, 2013, 10 pages.
Born et al., "Fabrication of Ultrasmall Tunnel Junctions by Electron Beam Direct-Writing", IEEE, 11(1) Mar. 2001, 4 pages.
Wang, Z. L, et al., "Quantum state characterization of a fast tunable superconducting resonator," Applied Physics Letters 102, 163503 (2013), 4 pages.
Il'ichev et al., "Degenerate Ground State in a Mesoscopic YBa2Cu3O7—x Grain Boundary Josephson Junction", Phys. Rev. Lett. 86, pp. 5369-5372, 2001.
Il'ichev et al., "Radio-frequency based monitoring of small supercurrents", Rev. Sci. Instrum. 72, pp. 1882-1887, 2001.
Il'ichev et al., "Radio-frequency method for characterization of superconducting weak links," Physica C 350, pp. 244-248, 2001.
Ilichev, et al., "Continuous Monitoring of Rabi Oscillations in a Josephson Flux Qubit", Physical Review Letters 91(9): 097906-1-097906-4, week ending Aug. 19, 2003.
Inokuchi et al., "Analog computation using quantum-flux parametron devices," Physica C 357-360 : 1618-1621, 2001.
International Search Report and Written Opinion for PCT/US2022/081515 dated Jan. 18, 2024, 9 pages.
James et al., "Scanning Hall probe Microscope images of Field penetration into niobium fields", Physica C 332, pp. 445-449, 2000.
Johnson, et al; "A scalable control system for a superconducting adiabatic quantum optimization processor", Superconductor Science and Technology; IOP Publishing; Supercond. Sci. Technol. 23 (2010); vol. 23, No. 6, Jun. 1, 2010, 12 pages.
Jones et al., Tunable electromagnetic environment for supercomputing, Jun. 13, 2013, Scientific Reports, pp. 1-5 (Year:2013).
Jonker et al., "On quantum and classical computing with arrays of superconducting persistent current qubits", Proceedings fifth IEEE International workshop on computer architectures for machine perception, Padova, italy, 11-13 Spe 2000, pp. 69-78.
Jordan, et al., "Perturbative Gadgets at Arbitrary Orders", arXiv:0802.1874v4 [quant-ph], Jan. 31, 2012.
Kane et al., "Silicon-based Quantum Computation", Fortschritte der Physik 48, pp. 1023-1041, 2000.
Knill , QCThresholdAnalysis 2004.
Knill, Fault-Tolerant Postselected Quantum Computation: Schemes, arXiv:quant-ph/0402171v1, Feb. 23, 2004, 17 pages.
Krech, "Linear Microwave Response of a Charge-Type Qubit", IEEE Trans. Appl. Supercond. 11, pp. 1022-1025, 2001.
Kulik et al., "Quantum Computational Gates With Radiation Free Couplings", www.arXiv.org preprint1 cond-mat/0203313 v1 (Mar. 14, 2002).
LaForestFlux-vector Model of Spin Noise in Superconducting Circuits: Electron Versus Nuclear Spins and Role of Phase Transition, arXiv: 1501.03776v3 [cond-mat.supr-con], Jul. 21, 2015 2015.
Lanting, Evidence for Temperature Dependent Spin-diffusion as a Mechanism of Intrinsic Flux Noise in SQUIDs, arXiv: 1306.1512v3 [cond-mat.supr-con], Dec. 23, 2013.
Lechner et al., "A quantum annealing architecture with all-to-all connectivity from local interactions", Science Advances., vol. 1, No. 19, Oct. 23, 2015.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Lidar , Towards Fault Tolerant Adiabatic Quantum Computation, arXiv: 0707.0021v3 [quant-ph], May 2, 2008.
Lidar et al., "Quantum Codes for Simplifying Design and Suppressing Decoherence in Superconducting Phase-Qubits", Quant. Inf. Proc. 1, pp. 155-182, 2002.
Lidar et al., "Reducing Constraints on Quantum Computer Design by Encoded Selective Recoupling", Phys. Rev. Lett. 88, 017905, pp. 1-4, 2002.
Litinski, et al., "A Game of Surface Codes: Large-Scale Quantum Computing with Lattice Surgery", arXuv:1808.0289.02892v3 [quant= ph] Feb. 3, 2019, 37 pages.
Macklin, et al., "A near-quantum-limited Josephson traveling-wave parametric amplifier", Science Sciencemag. org,, Oct. 16, 2015 vol. 350, Issue 6258, 5 pages.

(56) References Cited

OTHER PUBLICATIONS

Majer et al., "Simple phase bias for superconducting circuits", Applied Physics Letters 80 pp. 3638-3640, 2002.

Makhlin et al., "Josephson-Junction Qubits", Fortschritte der Physik 48, pp. 1043-1054, 2000.

Makhlin et al., "Nano-electronic circuits as quantum bits", ISACS 2000 Geneva. IEEE International Symposium on Circuits and Systems. Emerging Technologies of the 21st century Geneva, Switzerland, Mar. 28-32, 2000, pp. 241-244 vol. 2, Mar. 1, 2000.

Makhlin et al., "Quantum-state engineering with Josephson-junction devices", arXIv:cond-mat/0011269v1, Nov. 15, 2000.

Manucharyan et al., "Fluxonium: single Cooper pair circuit free of charge offsets", arXiv:0906.0831v2, [cond-mat.mes-hall] Oct. 20, 2009, 13 pages.

Marquardt et al., "Superposition of tWo mesoscopically distinct quantum states: Coupling a Cooper-pair box to a large superconducting island", Physical Review B, 63, pp. 054514-054520 (2001).

Martinis et al., "Rabi Oscillations in a Large Josephson-Junction Qubit," Physical Review Letters 89(11):117901-1-117901-4, Sep. 9, 2002.

Martinis, "Superconducting phase qubits," Quantum Inf Process 8:81-103, 2009.

Mc Hugh et al., "A quantum computer using a trapped-ion spin molecule and microwave radiation," arXiv:quant-ph/0310015v2, pp. 1-9, Apr. 13, 2004.

Mizuta, et al., "Quantum and Tunnelling Capacitance in Charge and Spin Qubits", arXiv:1604.02884v2 [cond-mat.mes-hall] Aug. 16, 2016, 9 pages.

Naaman et al., "On-Chip Josephson Junction Microwave Switch," arXiv:1512.01484v1, 10 pages, 2015.

Nagayama, et al., "Sureface code error correction on a defective lattice", IOP Publishing, New J. Phys. 19 (2017) 29 pages.

Neill, "A path towards quantum supremacy with superconducting qubits", PHD Thesis—University of California, Dec. 1, 2017.

Neven, "Suppressing quantum errors by scaling a surface code logical qubit", arXiv:2207.06431v1 [quant-ph] Jul. 13, 2022, 44 pages.

Nguyen et al, "Scalable High-Performance Fluxonium Quantum Processor", arXiv:2201.09374v2 [quant-ph] Feb. 5, 2022, 29 pages.

Chapman et al., "General Purpose Multiplexing Device for Cryogenic Microwave Systems," arXiv:1603.02716v2 [quant-ph] May 31, 2016, 10 pages.

Chow, et al., "Complete Universal Quantum Gate Set Approaching Fault-tolerant Thresholds with Superconducting Qubits", arXiv:1202.5344v1 [quant-ph], Feb. 23, 2012, 13 pages.

Christopher Eichler et al., 'Controlling the dynamic range of a Josephson parametric amplifier', EPJ Quantum Technology, vol. 1, No. 2, Jan. 29, 2014.

Clarke et al., "Quiet Readout of Superconducting Flux States," Physica Scripta. T102: 173-177, 2002.

Clarke et al., "Superconducting quantum bits," Nature 453:1031-1042, Jun. 19, 2008.

Cory et al., "NMR Based Quantum Information Processing: Achievements and Prospects", Fortschritte der Physik 48, pp. 875-907, 2000.

Cosmelli et al, "An Integrated System of SQUIDs For The Study Of Macroscopic Quantum Coherence", Supercond. Sci. Technol. 14, 2001.

Cosmelli, C., "Controllable Flux Coupling for the Integration of Flux Qubits," arXiv:cond-mat/0403690v1 [cond-mat.supr-con]. Mar. 29, 2004, 10 pages.

Cottet et al., "Implementation of a combined charge-phase quantum bit in a superconducting circuit", Physica C 367, pp. 197-203, 2002.

Devitt, Quantum Error Correction for Beginners, arXiv: 0905.2794v4 [quant-ph], Jun. 21, 2013 2013.

Devoret et al., "Superconducting Circuits for Quantum Information: An Outlook," Science 339:1169-1174, Mar. 8, 2013.

Devoret et al., "Superconducting Qubits: A Short Review," arXiv:cond-mat/0411174v1, Nov. 7, 2004, 41 pages.

Devoret, "Josephson-based Parametric Amplifiers for Quantum Measurements", Quantum-Mechanical Electronics Lab, Applied Physics and Physics, Yale University, Nov. 9, 92 pages, 2009.

Devoret, et al., "Introduction to Quantum-limited parametric Amplification of Quantum Signals with Josephson Circuits", arXiv:1605.00539v2, May 25, 2016, 28 pages.

Divincenzo et al., "Experimental Proposals for Quantum Computation", H-K Lo and S.L. Braunstein (eds. ), chapter 1, Wiley-VCH Verlag GmbH, Berlin (2001), also published wwwww. ArXiv.org preprint: quant-ph/0002077 (Apr. 13, 2000).

Dykman, "Quantum Computing Using Electrons Floating on Liquid Helium", Fortschritte der Physik 48, pp. 1095-1108, 2000.

Economist, Quantum Dreams, Economist,pp. 1-3 (Mar. 8, 2001).

Eddins, et al, "Josephson Parametric Amplifiers: Theory and Application", Quantum Nanoelectronics Laboratory, Department of Physics, University of CA, Berkley, Workshop on Microwave Cavity Design for Axion Detection Livermore Valley Open Campus, Aug. 2015.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Filippov et al., "Tunable Transformer for Qubits Based on Flux States," IEEE Transactions on Applied Superconductivity 13(2): 1-4, Jun. 2003.

Fowler, et al., "Surface codes: towards practical large-scale quantum computation", Phys. Rev. A 86, 032324—Published Sep. 18, 2012, 5 pages.

Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.

Friedman et al., "Quantum superposition of distinct macroscopic states," Nature 406:43-46, Jul. 6, 2000.

Geerlings, et al., "Improving the Quality Factor of Microwave Compact Resonators by Optimizing Their Geometrical Parameters", arXiv:1204.0742v3 [cond-mat.supr-con], Jun. 5, 2012.

Ghiu et al., "Asymmetric two-output quantum processor in any dimension," arXiv:quant-ph/0610138v1, pp. 1-8, Oct. 17, 2006.

Gotz et al., "Harmonic current-phase relation in Nb-Al-based superconductor/ normal conductor/ superconductor-type Josephson junctions between 4.2 K and the critical temperature", ApplPhys. Lett. 77, pp. 1354-1356 (2000).

Grangier et al., "Implementations of Quantum Computing Using Cavity Quantum Electrodynamics", Fortschritte der Physik 48, pp. 859-874, 2000.

Greenberg et al., "Low-frequency characterization of quantum tunneling in flux qubits", ArXiv.org preprint server: cond-mat/0208076, last accessed on Aug. 20, 2004.

Han et al., "Time-Resolved Measurement of Dissipation-Induced Decoherence in a Josephson Junction," Science 293:1457-1459, Aug. 24, 2001.

Harris et al., "A Compound Josephson Junction Coupler for Flux Qubits With Minimal Crosstalk," arXiv:0904.3784v3 [cond-mat.supr-con], Jul. 16, 2009, 5 pages.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Harris, Sign and Magnitude Tunable Coupler for Superconducting Flux Qubits, arXiv:cond-mat/0608253v1, Aug. 11, 2006.

Hekking et al., "Cooper Pair BOX Coupled To a Current-Biased Josephson Junction", arXiv.org:cond-mat/0201284 (2002).

Hofheinz, et al., "Generation of Fock States in a Superconducting Quantum Circuit", Nature 454, pp. 310-314, Jul. 1, 2008.

Hofheinz, et al., "Synthesizing Arbitrary Quantum Staes in a Superconducting Resonator, Nature", vol. 459, pp. 546-549, May 28, 2009.

Horsman, et al., "Surface code quantum computing by lattice surgery", 2012 Journal of Physics, 14 123011, 28 pages.

Hu et al., "Decoherence and dephasing in spin-based solid state quantum computers", arXiv.org:cond-mat/0108339v2, Sep. 6, 2001, (2001).

(56) References Cited

OTHER PUBLICATIONS

Il'ichev et al., "Characterization of superconducting structures designed for qubit realizations", Appl. Phys. Lett. 80, pp. 4184-4186, 2002.
Ettinger et al., "An Integrated 20 GHZ SiGe Bipolar Differential Oscillator with High Tuning Range", 2000.
Orlando et al, "Flux-based Superconducting Qubits For Quantum Computation" Physica C 372-376, 194-200, 2002.
Orlando et al., "Engineering the Quantum Measurement Process For The Persistent Current Qubit", Physica C 3681294-299 (Mar. 2002).
Ortlepp et al., "Access Time and Power Dissipation of a Model 256-Bit Single Flux Quantum RAM", IEEE Transactions on Applied Superconductivity, vol. 24, No. 4, Aug. 2014.
Ortlepp et al., "Design Guidelines for Suzuki Stacks as Reliable High-speed Josephson Voltage Drivers", Superconductor Science Technology, 26 (2013) 035007 (12pp).
Paik, et al., "Observation of High Coherence in Josephson Junction Qubits Measured in a Three-dimensional Circuit QED Architecture", arXiv:1105.4652v4 [quant-ph], Nov. 2, 2011.
Plastina et al. "Communicating Josephson qubits", arXiv.org:cond-mat/0206586 (2002).
Pop, et al., "Experimental Demonstration of Aharonov-Casher Interference in a Josephson Junction Circuit", arXiv:1104.3999v1 [cond-mat.mess-hall], Apr. 20, 2011.
Poyatos et al., "Schemes of Quantum Computations With Trapped Ions", Fortschritte der Physik 48, pp. 785-799, 2000.
Pudenz, et al., "Error corrected quantum annealing with hundreds of qubits", arXiv:1307.8190v1 [quant-ph] Jul. 31, 2013, 18 pages.
Puri, et al., "Quantum Annealing with All-to-all Connected Nonlinear Oscillators", Nature Communications, vol. 8, Article No. 15785, Jun. 8, 2017, 9 pages.
Raussendorf, et al., "Fault-Tolerant quantum computation with high threshold in two dimensions", arXiv:quant-ph/0610082v2, May 14, 2007, 4 pages.
Rey-de-Castro et al., "Design of an RSFQ Control Circuit to Observe MQC on an rf-SQUID", IEEE Transactions on Applied Superconductivity 11, pp. 1014-1017 (2001).
Sendelbach, et al., "Complex Inductance, Excess Noise, and Surface Magnetism in dc SQUIDs", Physical Review Letters 103, 117001, Sep. 11, 2009.
Sete, et al., "Purcell Effect with Microwave Drive: Suppression of Qubit Relaxation Rate", arXiv: 1401.5545v2, Mar. 21, 2014, 15 pages.
Shi, et al., "Multiplexed control scheme for scalable quantum information processing with superconducting qubits", arXiv:2312.06911v1 [quant-ph] Dec. 12, 2023, 8 pages.
Simbierowicz, et al., "Flux-driven Josephson Parametric Amplifier for Sub-GHz Frequencies Fabricated with Side-wall Passivated Spacer Junction Technology", arXiv:1805.07307v1, May 18, 2018, 15 pages.
Spiller, "Superconducting Circuits for Quantum Computing," Fortschritte der Physik 48, pp. 1075-1094, 2000.
Tanaka et al., "DC SQUID Readout Readout For Qubit," Physica C, 3681300 304 (Mar. 2002).
Tang, et al., "Robust surface code topology against sparse fabrication defects in a superconducting-qubit array", Phys. Rev. A 93. 032322—Published Mar. 15, 2018, 4 pages.
Van der Wal et al., "Quantum Superposition of Macroscopic Persistent current states", Science 290, pp. 773-777, 2000.
VanDenBrink, "Mediated Tunable Coupling of Flux Qubits", New Journal of Physics 7 (2005) 230, Nov. 7, 2005.
Vandersypen et al., "Experimental realization of order-finding With a quantum computer", ArXiv.org:quant-ph/0007017, pp. 1-4 (2000).
Venegas-Andraca, et al., "A cross-disciplinary introduction to quantum annealing-base algorithms", Contemporary Physics, Quantum Annealing ArXiv:1803.03372v1 [puant-ph] Mar. 9, 2018, 31 pages.
Venturelli et al., "Quantum Optimization of Fully-Connected Spin Glasses", arXiv, Jun. 29, 2014.
Vion et al., "Manipulating the quantum state of an electrical circuit", Science, 296, pp. 886-889 (2002).
Wang, et al., "Measurement of the Decay of Fock States in a Superconducting Quantum Circuit", arXiv:0808.3279v1 [cond-mat.mess-hall], Aug. 24, 2008.
Watanabe, M. et al., "Resonance-Free Low-Pass Filters for the AC Josephson Voltage Standard," IEEE Transactions on Applied Superconductivity, 16(1), Mar. 2006, 5 pages.
Wendin et al., "Superconducting Quantum Circuits, Qubits and Computing," arXiv:cond-mat/0508729v1 [cond-mat.supr-con], Aug. 30, 2005, 60 pages.
Wenner, et al., "Catching Time-Reversed Microwave Photons with 99.4% Absorption Efficiency", arXiv:1311.1180v2 [quant-ph], Nov. 16, 2013.
White et al., "Traveling wave parametric amplifier with Josephson junctions using minimal resonator phase matching", Applied Physics Letters 106, Jun. 15, 2015.
Yamamoto, "Flux Driven Josephson Parametric Amplifier", arXiv:0808.1386v1 [cond-mat.supr-con] 2008.
Yan et al., "A tunable coupling scheme for implementing high-fidelity two-qubit gates", Arxiv:1803.09813v1, Mar. 26, 2018.
Yin, et al., "Controlled Catch and Release of Microwave Photon States", arXiv:1208.2950v1 [cond-mat.supr-con], Aug. 14, 2012.
Yu et al., "Coherent temporal oscillations of macroscopic quantum states in a Josephson junction", Science, 296, pp. 889-892, 2002.
Zagoskin—Superconducting Qubits, La Physique au Canada 63(4):215-227, 2007.
Zhang et al., "Non-constant bias current for do SQUID operation", Physica C 368, pp. 181-184, 2002.
Zhang et al., "Substrate resonator for HTS rf SQUID operation", Physica C 372-3761282-286 (2002).
Zhao, et al. "Two-photon Driven Kerr Resonator for Quantum Annealing with Three-dimensional Circuit QED", arXiv:1712.03613v2, Dec. 12, 2017, 13 pages.
Zhou et al, "Experimental Realization of Spin Liquids in a Programmable Quantum Device", arXiv:2009.07853v2, 2020.
Zorin, "Radio-Frequency Bloch-Transistor Electrometer", Phys. Rev. Lett. 86, pp. 3388-3391, 2001.
Semenov, et al., Semenov, et al., "Classical and Quantum Operation Modes of the Reversible Logic Circuits," Department of Physics and Astronomy, Stony Brook University, Stony Brook, New York, Presentation, Dec. 2006, 29 pages.

\* cited by examiner

SYSTEMS AND METHODS FOR INCREASING ENERGY-SCALE BY MINIMIZING QUBIT INDUCTANCE

CROSS-REFERENCE TO RELATED APPLICATION

This patent application claims priority to U.S. Patent Application No. 63/265,388, filed on Dec. 14, 2021, the entire disclosure of which is hereby incorporated by reference herein for all purposes.

FIELD

This disclosure generally relates to systems and methods for increasing energy scale in quantum computing systems by reducing or minimizing qubit inductance.

BACKGROUND

Energy in Inductive Coupling

The energy scale for specifying a problem Hamiltonian on a quantum processor is given by $M_{AFM}I_P^2$ where $M_{AFM}$ is the maximum anti-ferromagnetic mutual inductance between two superconducting devices communicatively coupled by a coupling device such as two communicatively coupled qubits and $I_P$ is the average persistent current of the two superconducting devices. It is desirable to increase this energy scale to improve the performance of the quantum processor. However, coupling devices have an upper-limit to the mutual inductance between two communicatively coupled superconducting devices which is set by the coupler inductance and the device-to-coupler mutual inductance. The maximum anti-ferromagnetic mutual inductance between two communicatively coupled superconducting devices is given by:

$$M_{AFM} = M_1 M_2 X_{AFM}$$

where $M_1$ is the mutual inductance between the first superconducting device and the coupling device, $M_2$ is the mutual inductance between the second superconducting device and the coupling device, and $X_{AFM}$ is the maximum susceptibility of the coupling device (i.e., how strongly the coupling device couples the two superconducting devices together). The susceptibility of a coupling device is set by a flux bias of the coupling device given by $\Phi_{co}$. Increasing the critical current $I_c$ of the coupler will increase $X_{AFM}$ to an upper limit of $1/L_{co}$ where $L_{co}$ denotes the inductance of the coupler. Therefore, by increasing the critical current of the coupling devices in a quantum processor by a large factor (e.g., more than 10 times the persistent current), $X_{AFM}$ can be almost doubled. However, increasing the critical current of a coupling device increases the coupler's screening parameter or beta (a convenience parameter representing the behavior of a superconducting loop such as a qubit or coupling device that is used for modeling purposes). The beta ($\beta$) of a device is given by:

$$\beta = \frac{2\pi L_X I_C}{\phi_0}$$

where $\Phi_0$ is the flux quantum, and $L_X$ is the inductance of a device labeled X. For example, $L_{CO}$ would be for a coupler and $L_{QU}$ would be for a qubit. Increasing coupler beta increases the slope of the coupler susceptibility in the ferromagnetic region. Therefore, the coupler critical current cannot be increased by much without sacrificing the precision to which ferromagnetic/anti-ferromagnetic couplings can be specified.

Tunable Inductance

Inductance is the tendency of an electrical conductor to oppose a change in the electric current flowing through it. A component that adds inductance to a circuit is referred to in the present application as an inductor. An ideal inductor has no resistance and therefore no power dissipation. An inductor may include a length, a coil, a spiral, or a helix of wire. Current flowing through an inductor can generate a magnetic field in which energy can be stored. The magnetic energy stored in an inductor can be proportional to the square of the current flowing through the inductor.

There is thus a general desire for systems and methods for increasing qubit energy scale in quantum processing systems.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to increasing qubit energy scale in quantum processing systems.

A method for increasing available qubit energy scale in a hybrid computing system is described. The hybrid computing system comprises a quantum processor and at least one digital processor. The quantum processor comprises a plurality of qubits and couplers, and each qubit has a respective qubit body comprising a loop of superconducting material interrupted by at least one compound-compound Josephson junction (CCJJ). The qubit body is communicatively coupled to an inductance tuner (L-tuner). The method is executed by the at least one digital processor and comprises: causing a respective L-tuner of at least a set of qubits to compensate for a coupler inductance loading: determining a remaining respective L-tuner range for each qubit in the set of qubits: computing a minimum homogenized inductance across all qubits in the set of qubits from the remaining respective L-tuner range; causing a respective L-tuner of each qubit in the set of qubits to apply an inductance $\Delta L$ to each qubit in the set of qubits to achieve the minimum homogenized inductance; computing a first shift in CCJJ bias $\Delta_{CCJJ}$ due to the applied inductance $\Delta L$; and causing a respective CCJJ offset DAC of each qubit in the set of qubits to apply a respective second CCJJ bias shift $-\Delta_{CCJJ}*(M_{ccjj}-\text{mean}(M_{ccjj}))$ to each qubit in the set of qubits, wherein $M_{ccjj}$ is a mutual inductance between a respective CCJJ analog bias line and a respective lobe of the CCJJ and $\text{mean}(M_{ccjj})$ is a calculated mean value of $M_{ccjj}$ across all qubits. The method may further comprise applying a spin reversal transformation to increase a minimum sum of coupling strength J across all qubits in the set of qubits before causing a respective L-tuner of each qubit in the set of qubits to compensate for a coupler inductance loading. The method may further comprise computing a model of a shift in a qubit CCJJ bias as a function of qubit inductance at a tunneling rate. Computing the model of the shift in the qubit CCJJ bias as a function of qubit inductance at a tunneling rate may include computing the model of the shift in the qubit CCJJ bias as a function of qubit inductance at 1 GHz. Computing a first shift in CCJJ bias $\Delta_{CJJ}$ due to the applied inductance $\Delta L$ may include computing a first shift in CCJJ bias $\Delta_{CCJJ}$ due to the applied inductance $\Delta L$ based on the computation of the model of the shift in the qubit CCJJ bias as a function of qubit inductance at a tunneling rate. Computing the minimum homogenized inductance across all qubits may include: comparing a remaining respective L-tuner range for each qubit in the set of qubits; selecting a smallest remaining L-tuner range; and subtracting the smallest remaining L-tuner range from an inductance of the qubit with the smallest remaining L-tuner range to be the minimum homogenized inductance. The method may further comprise compensating for a crosstalk between a CCJJ offset DAC and the respective qubit body for each qubit in the set of qubits. Compensating for a crosstalk between the CCJJ offset DAC and the respective qubit body for each qubit in the set of qubits may include measuring an offset from each respective CCJJ offset DAC and causing a respective qubit flux bias to compensate for the measured offset. Causing a respective L-tuner of at least a set of qubits to compensate for a coupler inductance loading may include causing a respective L-tuner of each qubit in the set of qubits to compensate for a coupler inductance loading wherein each qubit in the set of qubits is utilized for an Ising spin problem to be computed by the quantum processor. Causing a respective L-tuner of each qubit in the set of qubits to apply an inductance $\Delta L$ to each qubit in the set of qubits may include causing a respective L-tuner of each qubit in the set of qubits to apply an inductance $\Delta L=-M_{afm}[a+\min(\Sigma_j J_{ij})]$, wherein $M_{afm}$ is the maximum antiferromagnetic coupling between two qubits, a is a constant, and $\Sigma_j J_{ij}$ is the sum of coupling strengths $J_{ij}$ between qubit i and coupled qubits j. Causing a respective L-tuner of each qubit in the set of qubits to apply an inductance $\Delta L$ to each qubit in the set of qubits may include causing a respective L-tuner of each qubit in the set of qubits to apply an inductance $\Delta L=-M_{afm}[a+\min(\Sigma_j J_{ij})]$, where a depends on a minimum allowed sum of coupling strength J.

A hybrid computing system may comprise: a quantum processor, the quantum processor comprising a plurality of qubits and couplers, each qubit in the plurality of qubits comprising a respective qubit body, the qubit body comprising a loop of superconducting material interrupted by at least one compound-compound Josephson junction (CCJJ), the qubit body communicatively coupled to an inductance tuner (L-tuner), the CCJJ communicatively coupled to a respective CCJJ analog bias line and a respective CCJJ offset DAC: at least one digital processor; and at least one non-transitory computer-readable storage medium communicatively coupled to the at least one digital processor and that stores processor-executable instructions which, when executed, causes the at least one digital processor to: cause a respective L-tuner of at least a set of qubits to compensate for a coupler inductance loading; determine a remaining respective L-tuner range for each qubit in the set of qubits; compute a minimum homogenized inductance across all qubits in the set of qubits from the remaining respective L-tuner range; cause a respective L-tuner of each qubit in the set of qubits to apply an inductance $\Delta L$ to each qubit in the set of qubits to achieve the minimum homogenized inductance; compute a first shift in CCJJ bias $\Delta_{CCJJ}$ due to the applied inductance $\Delta L$; and cause a respective CCJJ offset DAC of each qubit in the set of qubits to apply a respective second CCJJ bias shift $-\Delta_{CCJJ}*(M_{ccjj}-\mathrm{mean}(M_{ccjj}))$ to each qubit in the set of qubits, wherein $M_{ccjj}$ is a mutual inductance between a respective CCJJ analog bias line and a respective lobe of the CCJJ and $\mathrm{mean}(M_{ccjj})$ is a calculated mean value of $M_{ccjj}$ across all qubits. Each qubit body may be galvanically coupled to a respective L-tuner. The processor-executable instructions, when executed, may further cause the at least one digital processor to apply a spin reversal transformation to increase a minimum sum of coupling strength J across all qubits before causing a respective L-tuner of each qubits in the set of qubits to compensate for a coupler inductance loading. The processor-executable instructions, when executed, may cause the at least one digital processor to compute model of a shift in a qubit CCJJ bias as a function of qubit inductance at a tunneling rate. The processor-executable instructions, when executed, may cause the at least one digital processor to compute the model of the shift in the qubit CCJJ bias as a function of qubit inductance at 1 GHz. The processor-executable instructions, when executed, may cause the at least one digital processor to compute a first shift in CCJJ bias $\Delta_{CCJJ}$ due to the applied inductance $\Delta L$ based on the computation of the model of the shift in the qubit CCJJ bias as a function of qubit inductance at a tunneling rate. The processor-executable instructions, when executed, may cause the at least one digital processor to compute the minimum homogenized inductance across all qubits in the set of qubits by: comparing a remaining respective L-tuner range for each qubit in the set of qubits; selecting a smallest remaining L-tuner range; and subtracting the smallest remaining L-tuner range from an inductance of the qubit with the smallest remaining L-tuner range to be the minimum homogenized inductance. The processor-executable instructions, when executed, may further cause the at least one digital processor to compensate for a crosstalk between a CCJJ offset DAC and the respective qubit body for each qubit in the set of qubits. The processor-executable instructions, when executed, may cause the at least one digital processor to compensate for a crosstalk between a CCJJ offset DAC and the respective qubit body for each qubit in the set of qubits by measuring an offset from each respective CCJJ offset DAC and causing a respective qubit flux bias to compensate for the measured offset. Each qubit in the set of qubits may be utilized for an Ising spin problem to be computed by the quantum processor. The processor-executable instructions, when executed, may cause the at least one digital processor to cause a respective L-tuner of each qubit in the set of qubits to apply an inductance $\Delta L$ to each qubit in the set of qubits, wherein $\Delta L=-M_{afm}[a+\min(\Sigma_j J_{ij})]$, $M_{afm}$ is maximum antiferromagnetic coupling between two qubits, a is a constant, and $\Sigma_j J_{ij}$ is the sum of coupling strengths $J_{ij}$ between qubit i and coupled qubits j in the quantum processor. The processor-executable instructions, when executed, may cause the at least one digital processor to cause a respective L-tuner of each qubit in the set of qubits to apply an inductance $\Delta L$ to each qubit in the set of qubits, wherein $\Delta L=-M_{afm}[a+\min(\Sigma_j J_{ij})]$, where a depends on a minimum allowed sum of coupling strength J.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any infor- FIG. 1 is a schematic diagram of an example hybrid computing system comprising a quantum processor and a digital processor FIG. 2 is a schematic diagram of an example superconducting flux qubit comprising an inductance tuner.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or openended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Hybrid Quantum Computing System

Figure 1:
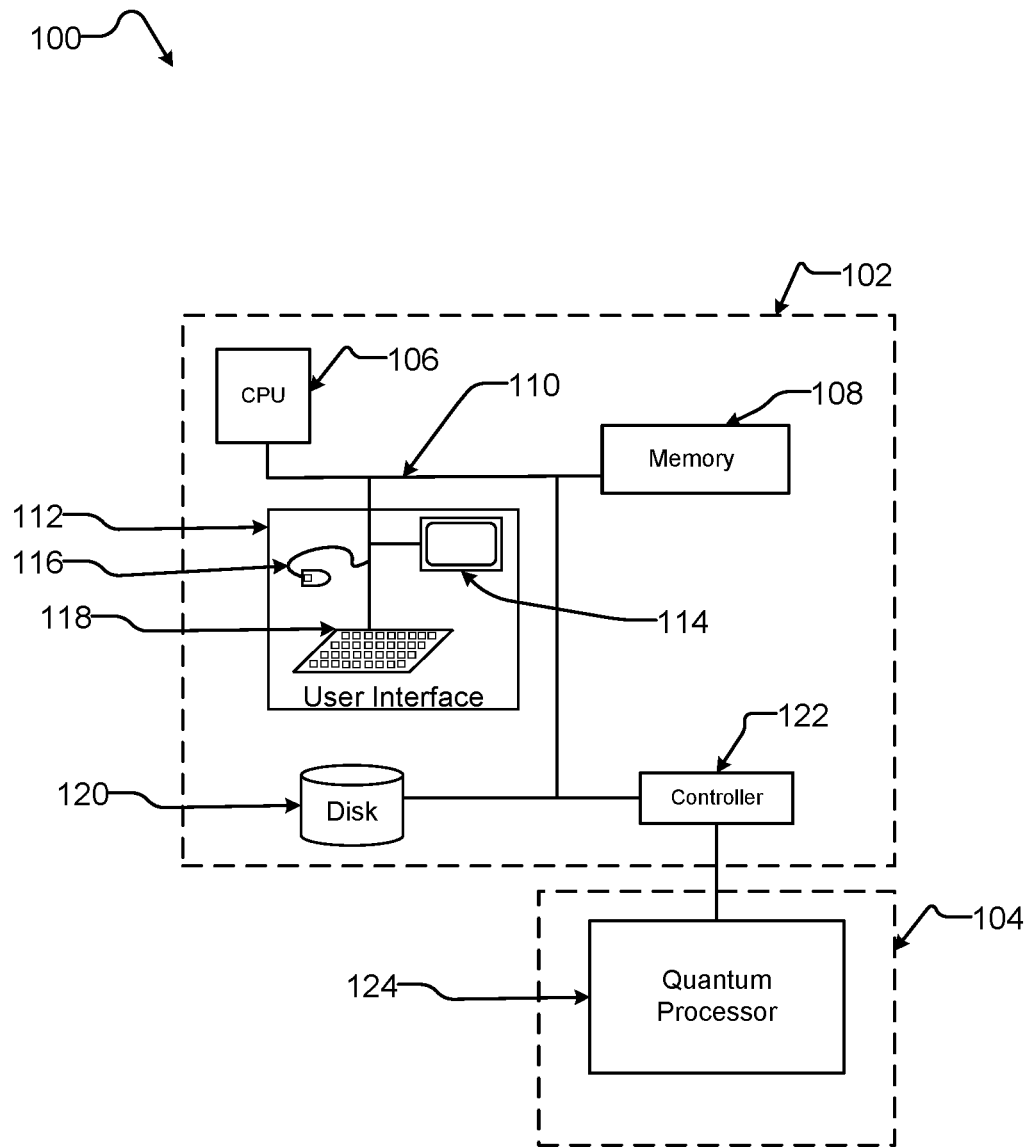

FIG. 1 illustrates a hybrid computing system 100 including a classical computer 102 coupled to a quantum computer 104. The example classical computer 102 includes a digital processor (CPU) 106 that may be used to perform classical digital processing tasks, and hence is denominated herein and in the claims as a classical processor.

Classical computer 102 may include at least one digital processor 106 (such as a central processor unit with one or more cores), at least one system memory 108, and at least one system bus 110 that couples various system components, including system memory 108 to digital processor 106. The digital processor may be any logic processing unit, such as one or more central processing units ("CPUs"), graphics processing units ("GPUs"), digital signal processors ("DSPs"), application-specific integrated circuits ("ASICs"), programmable gate arrays ("PGAs"), programmable logic controllers (PLCs), etc.

Classical computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random-access memory ("SRAM"), Flash NAND; and volatile memory such as random access memory ("RAM") (not shown).

Classical computer 102 may also include other non-transitory computer or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with the digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for classical computer 102.

Although classical computer 102 has been described as employing hard disks, optical disks and/or magnetic disks, those skilled in the relevant art will appreciate that other types of non-volatile computer-readable media may be employed, such magnetic cassettes, flash memory cards. Flash, ROMs, smart cards, etc. Those skilled in the relevant art will appreciate that some computer architectures employ volatile memory and non-volatile memory. For example, data in volatile memory can be cached to non-volatile memory, or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the classical computer 102 and quantum computer 104.

In some implementations system memory 108 may store processor- or computer-readable calculation instructions to perform pre-processing, co-processing, and post-processing to quantum computer 104. System memory 108 may store at set of quantum computer interface instructions to interact with quantum computer 104.

Quantum computer 104 may include one or more quantum processors such as quantum processor 124. Quantum computer 104 can be provided in an isolated environment, for example, in an isolated environment that shields the internal elements of the quantum computer from heat, magnetic field, and other external noise (not shown). Quantum processor 124 include programmable elements such as qubits, couplers and other devices. In some implementations, a quantum processor, such as quantum processor 124, may be designed to perform quantum annealing and/or adiabatic quantum computation. Examples of quantum processors for quantum annealing are described in U.S. Pat. No. 7,533,068.

Superconducting Qubits with L-Tuners

Figure 2:
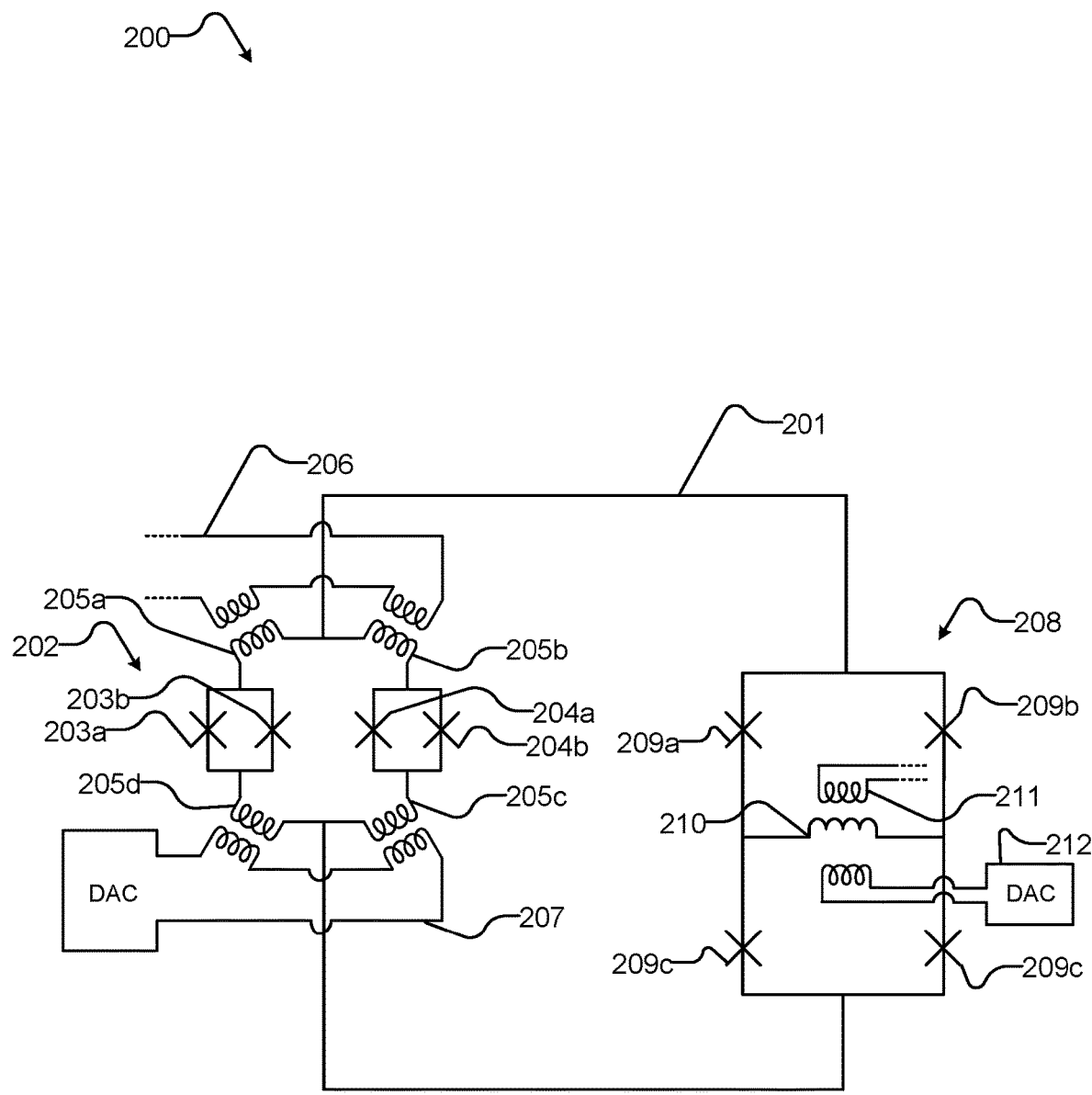

FIG. 2 is a schematic diagram of an example superconducting flux qubit 200 comprising an inductance tuner (also referred to herein as an L-tuner).

Example superconducting flux qubit 200 comprises a loop of superconducting material 201, interrupted by a compound-compound Josephson junction (CCJJ) 202. As used herein, a CCJJ refers to a compound Josephson junction (CJJ), wherein at least one of the parallel paths is itself a CJJ.

CCJJ 202 comprises four Josephson junctions 203a-203b and 204a-204b. CCJJ 202 further comprises four inductive interfaces 205a, 205b, 205c, 205d. Interfaces 205a and 205b are inductively coupled to shared analog line 206. Analog line 206 may be shared by multiple qubits (not shown in FIG. 2) in series in a quantum processor and is operable to apply a bias to CCJJ 202. Analog line 206 provides the same current flow to multiple devices simultaneously, although the bias received at each individual device is dependent on the mutual inductance between analog line 206 and the individual device. Analog line 206 provides to each device a time dependent waveform that is used, for example, for quantum annealing. Interfaces 205c and 205d are inductively coupled to CCJJ offset Digital to Analog Converter (DAC) 207. CCJJ offset DAC 207 is operable to apply a static bias offset to CCJJ 202. CCJJ offset DAC 207 is not shared with any other qubit or device in a quantum processor and provides a static bias to only one qubit (e.g., superconducting flux qubit 200). In a quantum processor with a plurality of qubits, each CCJJ offset DAC 207 can provide a different bias to each qubit.

Qubit 200 further comprises an L-tuner 208, galvanically coupled to loop of superconducting material 201. L-tuner 208 comprises four Josephson junctions 209a, 209b, 209c, 209d and inductance 210. Inductance 210 is communicatively coupled to shared analog line 211 and DAC 212. Analog line 211 is shared between multiple L-tuners in series (not shown in FIG. 2) and provides the same current flow to multiple devices simultaneously, although the bias received at each individual device is dependent on the mutual inductance between analog line 211 and the individual device. Analog line 211 provides to each device a time dependent waveform. DAC 212 is not shared with any other L-tuner or device in a quantum processor and provides a static bias to only one L-tuner (e.g., L-tuner 208). In some implementations, analog line 211 is not present and only DAC 212 is used to provide a static bias to L-tuner 208. A person skilled in the art will understand that L-tuner 208 is an example implementation of an inductance tuner and, in other implementations, an L-tuner as discussed herein may include different physical structures (e.g., Josephson junctions, inductances . . . ). Further examples of L-tuners are described in International Patent Publication No WO2010028183A2.

Figure 3:
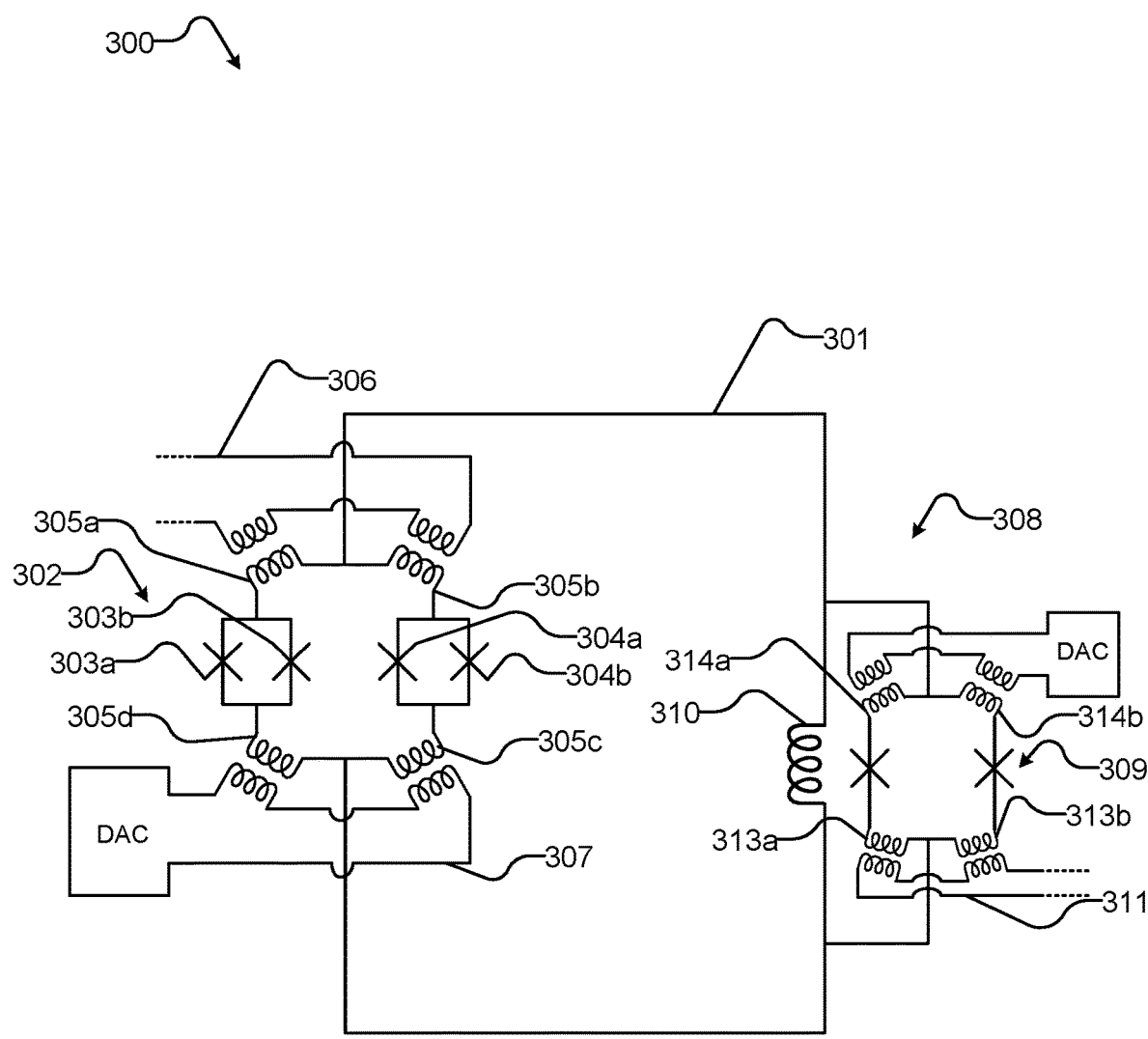
FIG. 3 is a schematic diagram of another example superconducting flux qubit comprising an inductance tuner.

FIG. 3 is a schematic diagram of another example superconducting flux qubit 300 comprising an inductance tuner (or L-tuner).

Similar to superconducting flux qubit 200, example superconducting flux qubit 300 comprises a loop of superconducting material 301, interrupted by a compound-compound Josephson junction (CCJJ) 302.

CCJJ 302 comprises Josephson junctions 303a-303b and 304a-304b. CCJJ 302 further comprises inductive interfaces 305a, 305b, 305c, 305d. Interfaces 305a and 305b are inductively coupled to shared analog line 306. Analog line 306 may be shared by multiple qubits (not shown in FIG. 3) in series in a quantum processor and is operable to apply a bias to CCJJ 302. Analog line 306 provides the same current flow to multiple qubits simultaneously, although the bias received at each individual qubit is dependent on the mutual inductance between analog line 306 and the individual qubit. Analog line 306 provides to each qubit a time dependent waveform that is used, for example, for quantum annealing. Interfaces 305c and 305d are inductively coupled to CCJJ offset DAC 307. CCJJ offset DAC 307 is operable to apply a static bias offset to CCJJ 302. CCJJ offset DAC 307 is not shared with any other qubit or device in a quantum processor and provides a static bias to only one qubit (e.g., superconducting flux qubit 300). In a quantum processor with a plurality of qubits, each CCJJ offset DAC 307 can provide a different bias to each qubit.

Qubit 300 further comprises an L-tuner 308. L-tuner 308 provides the same capability to adjust inductance on a qubit as L-tuner 208 in an alternative implementation.

L-tuner 308 comprises compound Josephson junctions (CJJ) 309 and inductance 310. CJJ 309 is communicatively coupled to shared analog line 311 and DAC 312 via inductive interfaces 313a-313b and 314a-314b, respectively. Analog line 311 is shared between multiple L-tuners in series (not shown in FIG. 3) and provides the same current flow to multiple L-tuners simultaneously, although the bias received at each individual L-tuner is dependent on the mutual inductance between analog line 311 and the individual L-tuner. Analog line 311 provides to each L-tuner a time dependent waveform. DAC 312 is not shared with any other L-tuner or device in a quantum processor and provides a static bias to only one L-tuner (e.g., L-tuner 308). In some implementations, analog line 311 is not present and only DAC 312 used to provide a static bias to L-tuner 308. A person skilled in the art will understand that L-tuner 308 is an example implementation of an inductance tuner and, in other implementations, an L-tuner may be provided that includes different physical structures (e.g., Josephson junctions, inductances . . . ).

While the example implementations of FIG. 2 and FIG. 3 each show one L-tuner associated with a qubit, it will be understood that in other implementations, multiple L-tuners may be provided for a given qubit.

Qubit Energy Scale

Qubit energy scale is a measure of the energy separation between the ground state and the first excited state of a qubit. In general, higher qubit energy scale results in better quantum processor performance, as a larger energy separation results in the processor being more likely to remain in a ground state throughout an annealing cycle or other quantum evolution. Higher qubit energy scale is therefore a desirable characteristic of a quantum annealing processor.

The goal of a quantum annealing processor is to find a ground state of a given Ising spin problem. Thermal fluctuations can cause the quantum processor system to be excited above the ground state, causing a computational errors and degeneration of system performance. For a given temperature, the probability of thermal excitation depends exponentially on energy scale. Therefore, even a modest increase in energy scale can yield large improvements in processor performance and it is thus desirable.

One approach to improve energy scale is to reduce or minimize qubit inductance. Qubit inductance is inversely proportional to qubit energy scale, so that the lower the qubit inductance, the higher the energy scale. However, some inductance is necessary for constructing a superconductive flux qubit and achieving coupling between qubits. In some implementations, the efficiency of qubit inductance may be improved through optimizing or improving the design and calibration of a quantum processor. For example, inductance can be improved during a design phase of a quantum processor by reducing or minimizing parasitic inductance that does not play a role in coupling. In design and in calibration, inductance can be homogenized across qubits.

The inductance of each qubit depends on the magnitude of the coupling strength of couplers that are coupled to the qubits.

Generally, each coupler modifies the inductance of the qubits it couples according to the relationship $-M_{ij}M_{ij}\chi_{ij}$, where $M_{ij}$ is the mutual inductance between qubit i and the coupling device that couples qubit i to qubit j, and $\chi_{ij}$ is the susceptibility of the coupling device. When $M_{ij}$ is uniform across qubits and couplers, the formula above can be simplified to $-M_{afm}*J_{ij}$, where $M_{afm}=M_{ij}M_{ij}\chi_{afm}$ is the maximum antiferromagnetic coupling between two qubits, $\chi_{afm}$ is the maximum antiferromagnetic coupler susceptibility and $J_{ij}=\chi_{ij}/\chi_{afm}$ is the normalized coupling strength. In an example implementation, $M_{afm}$ may be 2 pH, such that a ferromagnetic coupling of $J_{ij}=-1$ increases the qubit inductances by 2 pH, while an antiferromagnetic coupling of J=+1 decreases them by 2 pH.

The net change in inductance $\Delta L$ on qubit i is given by:

$$\Delta L_i = -M_{afm}\sum_j J_{ij}$$

To compensate for the change in qubit inductance due to applied coupling required for a given problem, inductance-tuners (or L-tuners) are used. One or more L-tuners on each qubit is adjusted for each problem to compensate for coupler inductive loading and to bring the inductance of each qubit back to a baseline value. This baseline value may be chosen during a calibration phase of a quantum processor to be the minimum achievable for all allowed problems that will be submitted to the quantum processor.

L-tuners have a fixed inductance range over which the L-tuner can compensate. This means that for any problem, the sum of J on each qubit must be within a given range. For example, an allowed range may be $$-a < \sum_j J_{ij} < b$$

Where the constants a and b depend on the L-tuner range and the number of couplers per qubit. The constant b may be, in some implementations, equal to the connectivity of a qubit in a given architecture of a quantum processor. The constant a is the minimum allowed sum of all $J_{ij}$ for any qubit i over all qubits j that are communicatively coupled to qubit i.

In an example implementation of a quantum processor with a qubit connectivity of 15 and $-2<J_{ij}<1$, where the minimum allowed sum over the values of J is $-18$:

$$-18 < \sum_j J_{ij} < 15$$

In the present description and the appended claims, an "allowed problem" is a problem where all the values for $J_{ij}$ and the sum of $J_{ij}$ for each qubit i meets an allowed range, such as the example allowed range provided above.

It is desirable to choose a baseline inductance that can be achieved for all qubits and all allowed problems to be submitted to the quantum processor. For any given problem, L-tuners are adjusted to compensate coupler inductive loading and maintain this baseline inductance. However, for many problems for which coupler inductive loading is not maximal, the full range of the L-tuners is not needed. Therefore, for these problems, there is L-tuner range that is not utilized and would be available to further reduce qubit inductance. It is desirable to make use of this non-utilized L-tuner range to reduce qubit inductance even further and thus increase qubit energy scale for some problems.

Boosting Energy Scale with Unused L-Tuner Range

For a given problem, if the full range of the L-tuners is not utilized, the remaining range may be used to reduce qubit inductance, which improves energy-scale. To keep the annealing schedules for all qubits homogenized, the inductance for all qubits should be decreased uniformly. For the example allowed range given above, the maximum drop in inductance $\Delta L$ is limited by the minimum $\Sigma_j J_{ij}$.

$$\Delta L = -M_{afm}\left(a + \min\left(\sum_j J_{ij}\right)\right)$$

Where the constant a depends on the range of coupling strength J for an allowed problem, as described above. For example, in some implementations, a=18.

It may be necessary to perform additional calibration to rebalance the qubits for a chosen min $(\Sigma_j J_{ij})$ after further reducing the inductance.

It may be possible to increase the minimum sum of coupling strength J across all qubits, min $(\Sigma_j J_{ij})$, for any given problem using spin reversal transformations. This may lead to a lower achievable qubit inductance compared to the qubit inductance of the original problem without spin reversal transformation. The term 'spin reversal transformation' is herein used to denote the principle that the flipping the sign of the 'h' (bias) applied to a qubit and the sign of the 'J' of all the couplers coupled to it leads to the same problem solution when the answer obtained for the flipped qubit is inverted. For example, a two-qubit problem with J=−1 can be transformed to a two-qubit problem with J=+1.

In some implementations, nonlinearity and flux offsets are introduced by L-tuners, and increase with L-tuner inductance. As such, reducing qubit inductance with unused L-tuner range may also improve L-tuner linearity and decrease L-tuner flux offsets.

Quantum annealing is performed using a global bias line, for example analog line 206 or analog line 306 of FIG. 2 or FIG. 3, respectively, to vary the CCJJ bias of all qubits simultaneously from an initial value to a final value. When the inductance of a qubit is changed, due for example to applying a coupling strength, there is a shift in the CCJJ bias at which quantum annealing is performed for that qubit. This shift depends on the mutual inductance $M_{ccjj}$ between the global CCJJ bias line and the qubit CCJJ loop. $M_{ccjj}$ can vary between qubits, which can lead to a variation in the CCJJ bias shift, desynchronizing the qubits. The variation in CCJJ bias shift can be compensated using the CCJJ offset DAC, for example CCJJ offset DAC 207 or CCJJ offset DAC 307 of FIG. 2 or FIG. 3, respectively. A description of this compensation is included in the FIG. 4 flow chart.

Figure 4:
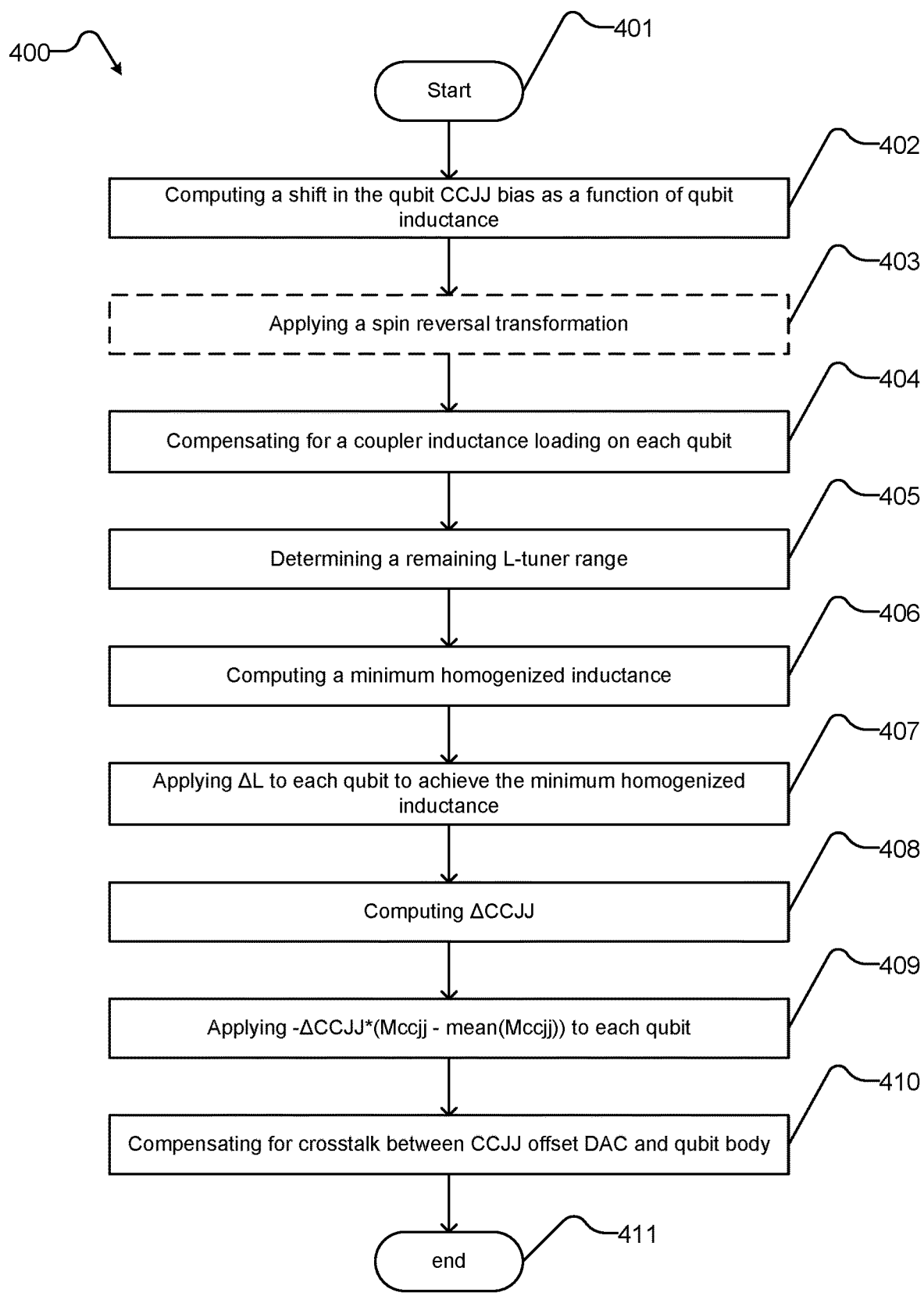
FIG. 4 is a flow chart of an example method for increasing energy-scale by reducing or minimizing qubit inductance.

FIG. 4 is a flow chart of an example method 400 for increasing energy-scale by reducing or minimizing qubit inductance. Method 400 may be executed by a digital processor in a hybrid computing system, for example hybrid computing system 100 of FIG. 1.

Method 400 comprises acts 401 to 411: however, a person skilled in the art will understand that the number of acts is an example, and, in some implementations, certain acts may be omitted, further acts may be added, and/or the order of the acts may be changed.

Method 400 starts at 401, for example in response to a call from another routine.

At 402, a digital processor, such as digital processor 106 of FIG. 1, computes a model of the shift in CCJJ bias in a qubit CCJJ as a function of qubit inductance. The method below will be discussed in terms of digital processor 106; however, it will be understood that the method may be performed by other implementations of digital processors. In some implementations, digital processor 106 computes a shift in CCJJ bias in a qubit CCJJ, for example CCJJ 202 or CCJJ 302 of qubits 200 or 300, respectively. Digital processor 106 may use a model of the qubit and calibrated qubit quantities to compute a CCJJ bias shift. Digital processor 106 may compute the CCJJ bias shift at a chosen tunneling rate that may be representative of a quantum computer, such as quantum computer 104, for example 1 GHz.

Act 402 may be performed once by digital processor 106 and the computed results reused in subsequent iterations of method 400. Acts 403 through 410 may be repeated for different Ising problems submitted to hybrid computing system 100.

At 403, optionally digital processor 106 applies a spin reversal transformation to increase the minimum sum of/across all qubits. This may lead to a lower achievable qubit inductance. Act 403 may be performed when an initial qubit inductance for a given problem is higher than a desired threshold.

At 404, digital processor 106 compensates for coupler inductive loading by adjusting the L-tuner of each qubit. In some implementations, where only a portion of the qubits in quantum processor 124 are utilized, for example to solve a computational problem, digital processor 106 adjust the L-tuner on the utilized qubits only.

At 405, digital processor 106 determines the remaining L-tuner range on each qubit. In some implementations, where only a portion of the qubits in quantum processor 124 are utilized, digital processor 106 only checks the remaining L-tuner range of the utilized qubits.

At 406, digital processor 106 computes the minimum homogenized inductance achievable across all qubits (or, in some implementations, across the utilized qubits). The minimum homogenized inductance can be computed by comparing all the remaining L-tuner ranges determined at 405 and selecting the inductance of the qubit with the smallest remaining L-tuner range and subtracting from it the smallest remaining L-tuner range. In some implementations, a minimum homogenized inductance may be selected to be larger than the inductance of the qubit with the smallest remaining L-tuner range determined at 405 and then subtracting from it the smallest remaining L-tuner range.

At 407, digital processor 106 applies an inductance $\Delta L$ to each qubit to achieve the minimum homogenized inductance. After act 407, the inductance of each qubit is the baseline inductance minus $\Delta L$, where $\Delta L$ is maximized for each computational problem submitted to quantum computer 104. In some implementations, where only a portion of the qubits in quantum processor 124 are utilized, for example to solve a computational problem, digital processor 106 applies an inductance $\Delta L$ only to each utilized qubit.

At 408, digital processor 106 computes the shift in CCJJ bias $\Delta_{CCJJ}$ due to the applied inductance $\Delta L$. The model of the shift in CCJJ bias in a qubit CCJJ as a function of qubit inductance computed at act 402 may be utilized to compute $\Delta_{CCJJ}$.

At 409, digital processor 106 applies a CCJJ bias shift to each qubit (or to each utilized qubit) equal to $-\Delta_{CCJJ}*(M_{ccjj}-\text{mean}(M_{ccjj}))$ using the respective CCJJ offset DAC associated with each qubit, for example CCJJ offset DAC 207 or CCJJ offset DAC 307 of FIGS. 2 and 3, respectively. $M_{ccjj}$ is the mutual inductance between a respective CCJJ analog bias line and the respective lobe of the CCJJ and mean($M_{ccjj}$) is a calculated mean value of $M_{ccjj}$ across all qubits. This will ensure or at least improve the qubits (or the utilized qubits) remaining synchronized at the tunneling rate at act 402.

At 410, digital processor 106 compensates for crosstalk between each qubit offset DAC and the qubit body. In some implementations, digital processor 106 measures the offset from each respective CCJJ offset DAC and compensates for the measured offset via the respective qubit flux bias.

At 411, method 400 terminates, until it is, for example, invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. No. 7,533,068, and International Patent Publication No WO2010028183A2.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for increasing available qubit energy scale in a hybrid computing system, the hybrid computing system comprising a quantum processor and at least one digital processor, the quantum processor comprising a plurality of qubits and couplers, each qubit having a respective qubit body comprising a loop of superconducting material interrupted by at least one compound-compound Josephson junction (CCJJ), the qubit body communicatively coupled to an inductance tuner (L-tuner), the method executed by the at least one digital processor and comprising:
   causing a respective L-tuner of at least a set of qubits to compensate for a coupler inductance loading;
   determining a remaining respective L-tuner range for each qubit in the set of qubits;
   computing a minimum homogenized inductance across all qubits in the set of qubits from the remaining respective L-tuner range;
   causing a respective L-tuner of each qubit in the set of qubits to apply an inductance AL to each qubit in the set of qubits to achieve the minimum homogenized inductance;
   computing a first shift in CCJJ bias $\Delta'_{CCJJ}$ due to the applied inductance AL; and
   causing a respective CCJJ offset DAC of each qubit in the set of qubits to apply a respective second shift in CCJJ bias $\Delta''_{CCJJ}$ to each qubit in the set of qubits to compensate for the first shift in CCJJ bias.

2. The method of claim 1, further comprising applying a spin reversal transformation to increase a minimum sum of coupling strength J across all qubits in the set of qubits before causing a respective L-tuner of each qubit in the set of qubits to compensate for a coupler inductance loading.

3. The method of claim 1, further comprising computing a model of a shift in a qubit CCJJ bias as a function of qubit inductance at a tunneling rate.

4. The method of claim 3, wherein computing a first shift in CCJJ bias $\Delta'_{CJJ}$ due to the applied inductance $\Delta L$ includes computing a first shift in CCJJ bias $\Delta'_{CCJJ}$ due to the applied inductance $\Delta L$ based on the computation of the model of the shift in the qubit CCJJ bias as a function of qubit inductance at a tunneling rate.

5. The method of claim 1, wherein computing the minimum homogenized inductance across all qubits includes:
   comparing a remaining respective L-tuner range for each qubit in the set of qubits;
   selecting a smallest remaining L-tuner range; and
   subtracting the smallest remaining L-tuner range from an inductance of the qubit with the smallest remaining L-tuner range to be the minimum homogenized inductance.

6. The method of claim 1, further comprising compensating for a crosstalk between a CCJJ offset DAC and the respective qubit body for each qubit in the set of qubits by measuring an offset from each respective CCJJ offset DAC and causing a respective qubit flux bias to compensate for the measured offset.

7. The method of claim 1, wherein causing a respective L-tuner of at least a set of qubits to compensate for a coupler inductance loading includes causing a respective L-tuner of each qubit in the set of qubits to compensate for a coupler inductance loading wherein each qubit in the set of qubits is utilized for an Ising spin problem to be computed by the quantum processor.

8. The method of claim 1, wherein causing a respective L-tuner of each qubit in the set of qubits to apply an inductance $\Delta L$ to each qubit in the set of qubits includes causing a respective L-tuner of each qubit in the set of qubits to apply an inductance $\Delta L = -M_{afm}[a+\min(\Sigma_j J_{ij})]$, wherein $M_{afm}$ is a maximum antiferromagnetic coupling between two qubits, a is a constant, and $\Sigma_j J_{ij}$ is a sum of coupling strengths $J_{ij}$ between qubit i and coupled qubits j.

9. The method of claim 8 wherein causing a respective L-tuner of each qubit in the set of qubits to apply an inductance $\Delta L$ to each qubit in the set of qubits includes causing a respective L-tuner of each qubit in the set of qubits to apply an inductance $\Delta L = -M_{afm}[a+\min(\Sigma_j J_{ij})]$, where a depends on a minimum allowed sum of coupling strength J.

10. The method of claim 1, wherein causing a respective CCJJ offset DAC of each qubit in the set of qubits to apply a respective second shift in CCJJ bias $\Delta''_{CCJJ}$ to each qubit in the set of qubits includes causing a respective CCJJ offset DAC of each qubit in the set of qubits to apply a respective second shift in CCJJ bias $\Delta''_{CCJJ} = -\Delta'_{CCJJ} * (M_{ccji} - \text{mean}(M_{ccjj}))$, wherein $M_{ccjj}$ is a mutual inductance between a respective CCJJ analog bias line and a respective lobe of the CCJJ and mean($M_{ccjj}$) is a calculated mean value of $M_{ccjj}$ across all qubits.

11. A hybrid computing system comprising:
   a quantum processor, the quantum processor comprising a plurality of qubits and couplers, each qubit in the plurality of qubits comprising a respective qubit body, the qubit body comprising a loop of superconducting material interrupted by at least one compound-compound Josephson junction (CCJJ), the qubit body communicatively coupled to an inductance tuner (L-tuner), the CCJJ communicatively coupled to a respective CCJJ analog bias line and a respective CCJJ offset DAC;
   at least one digital processor; and
   at least one non-transitory computer-readable storage medium communicatively coupled to the at least one digital processor and that stores processor-executable instructions which, when executed, causes the at least one digital processor to:
   cause a respective L-tuner of at least a set of qubits to compensate for a coupler inductance loading;
   determine a remaining respective L-tuner range for each qubit in the set of qubits;
   compute a minimum homogenized inductance across all qubits in the set of qubits from the remaining respective L-tuner range;
   cause a respective L-tuner of each qubit in the set of qubits to apply an inductance $\Delta L$ to each qubit in the set of qubits to achieve the minimum homogenized inductance;
   compute a first shift in CCJJ bias $\Delta'_{CCJJ}$ due to the applied inductance $\Delta L$; and
   cause a respective CCJJ offset DAC of each qubit in the set of qubits to apply a respective second shift in CCJJ bias $\Delta''_{CCJJ}$ to each qubit in the set of qubits.

12. The hybrid computing system of claim 11, wherein each qubit body is galvanically coupled to a respective L-tuner.

13. The hybrid computing system of claim 11, wherein the processor-executable instructions, when executed, further causes the at least one digital processor to apply a spin reversal transformation to increase a minimum sum of coupling strength J across all qubits before causing a respective L-tuner of each qubits in the set of qubits to compensate for a coupler inductance loading.

14. The hybrid computing system of claim 11, wherein the processor-executable instructions, when executed, causes the at least one digital processor to compute model of a shift in a qubit CCJJ bias as a function of qubit inductance at a tunneling rate.

15. The hybrid computing system of claim 14, wherein the processor-executable instructions, when executed, causes the at least one digital processor to compute a first shift in CCJJ bias $\Delta_{CCJJ}$ due to the applied inductance $\Delta L$ based on the computation of the model of the shift in the qubit CCJJ bias as a function of qubit inductance at a tunneling rate.

16. The hybrid computing system of claim 11, wherein the processor-executable instructions, when executed, causes the at least one digital processor to compute the minimum homogenized inductance across all qubits in the set of qubits by:
  comparing a remaining respective L-tuner range for each qubit in the set of qubits;
  selecting a smallest remaining L-tuner range; and
  subtracting the smallest remaining L-tuner range from an inductance of the qubit with the smallest remaining L-tuner range to be the minimum homogenized inductance.

17. The hybrid computing system of claim 11, wherein the processor-executable instructions, when executed, further causes the at least one digital processor to compensate for a crosstalk between a CCJJ offset DAC and the respective qubit body for each qubit in the set of qubits by measuring an offset from each respective CCJJ offset DAC and causing a respective qubit flux bias to compensate for the measured offset.

18. The hybrid computing system of claim 11, wherein the processor-executable instructions, when executed, causes the at least one digital processor to cause a respective L-tuner of each qubit in the set of qubits to apply an inductance $\Delta L$ to each qubit in the set of qubits, wherein $\Delta L = -M_{afm}[a + \min(\Sigma_j J_{ij})]$, $M_{afm}$ is a maximum antiferromagnetic coupling between two qubits, a is a constant, and $\Sigma_j J_{ij}$ is a sum of coupling strengths $J_{ij}$ between qubit i and coupled qubits j in the quantum processor.

19. The hybrid computing system of claim 18, wherein the processor-executable instructions, when executed, causes the at least one digital processor to cause a respective L-tuner of each qubit in the set of qubits to apply an inductance $\Delta L$ to each qubit in the set of qubits, wherein $\Delta L = -M_{afm}[a + \min(\Sigma_j J_{ij})]$, where a depends on a minimum allowed sum of coupling strength J.

20. The hybrid computing system of claim 11, wherein the second shift in CCJJ bias $\Delta''_{CCJJ}$ is $\Delta''_{CCJJ} = -\Delta'_{CCJJ} * (M_{ccjj} - \mathrm{mean}(M_{ccjj}))$, wherein $M_{ccjj}$ is a mutual inductance between a respective CCJJ analog bias line and a respective lobe of the CCJJ and $\mathrm{mean}(M_{ccjj})$ is a calculated mean value of $M_{ccjj}$ across all qubits.

* * * * *